Patented June 3, 1924.

1,496,458

UNITED STATES PATENT OFFICE.

VICTOR A. FRIEND, OF MELROSE, MASSACHUSETTS, ASSIGNOR, BY MESNE ASSIGNMENTS, TO LESLIE A. FRIEND, VICTOR A. FRIEND, ROBERT FRIEND, AND WALTER A. FRIEND, COPARTNERS DOING BUSINESS AS FRIEND BROTHERS, ALL OF MELROSE, MASSACHUSETTS.

METHOD OF PREPARING CANNED BAKED BEANS.

No Drawing. Application filed December 14, 1922. Serial No. 606,970.

*To all whom it may concern:*

Be it known that I, VICTOR A. FRIEND, a citizen of the United States, residing at Melrose, in the county of Middlesex and State of Massachusetts, have invented a new and useful Improvement in Method of Preparing Canned Baked Beans, of which the following is a specification.

My invention relates to canned baked beans and to a method of preparing the same and this application is a continuation of my application for method of preparing and canning baked beans, Serial No. 395,637, filed July 12, 1920, in so far as the matter contained herein is disclosed therein.

It has long been customary for housewives, especially in New England, to prepare what are known as "baked beans"; that is, dried beans of any one variety of a number of well known varieties, subjected with a small amount of pork to a continuous baking of eight to ten hours duration in a brick or stove oven under a high temperature. During this cooking the beans are from time to time covered with water to prevent burning but the bulk of the water is allowed to dry out at the end of the cooking; sufficient, however, being retained to keep the beans juicy. This long cooking causes the pork to be thoroughly cooked and permeates the beans with its fat and flavor. Baked beans produced by this process have a delectable flavor and in the eastern part of the United States this dish is a food staple in common and extensive use with a high nutriment value.

With the advent of canning, attempts were made to reproduce this staple of food in canned form but all such attempts have heretofore failed to secure results at all comparable with those obtained by the housewife. These failures have all been due to the fact that the beans have been canned without the preliminary baking at a high temperature for a long period of time to which is due the color and flavor of baked beans. Generally, the canners in preparing what are known as "canned beans," or "canned pork and beans," because heretofore canned baked beans have been unknown to the market, have placed the beans with a piece of pork in the cans without any cooking other than a superficial par-boiling, sealed the cans and then subjected them to a sterilizing of from two to three hours at a moderate temperature of from 212° to 240° Fahrenheit. The result is to all intents and purposes stewed beans, lacking both the color and flavor of baked beans; a dish not particularly palatable. The pork is practically uncooked and contributes nothing to the flavor. By adding coloring and flavoring matters, the canners have endeavored to change the white color and tasteless flavor of stewed beans, but the product in all cases lacks the delectable flavor of baked beans.

The principal object of my invention is the production of canned baked beans as a commercial product, having all the flavor and quality of the home-made product.

Another object of the invention is the provision of a method for preparing and canning baked beans having the characteristics of the home-made product as a commercial product which may be kept indefinitely without spoiling or deteriorating in quality and flavor.

A further object is to accomplish the foregoing result without requiring the use of artificial coloring matter or artificial flavoring, so that the color and flavor secured in the product is the color and flavor of baked beans.

Other objects of the invention will be more specifically set forth and described hereinafter.

Briefly, my invention contemplates a method in which beans are prepared and baked by being subjected to a high degree of heat for a comparatively long period of time, and are then canned while still hot and sterilized after the cans are sealed.

My method comprises three steps. First, the baking of the beans; second, the canning of the baked beans while hot; and, third, the sterilizing of the cans.

In carrying out the first step of the process, the beans are first sorted for the removal of all foreign and extraneous matter, washed and then placed in earthen crocks or iron receptacles of suitable capacity. I have found for cooking on a large scale that iron crocks of approximately fourteen quarts capacity each are well adapted for the purpose and may be easily handled. After the crocks have been filled with beans to about one-third of capacity since they swell in cooking, a piece of fat or mixed fat and lean pork is placed on top of the beans in each crock in the proportion of about thirty-five pounds of pork to every hundred pounds of beans and the crocks are then filled with water to within a short distance of the tops. Small amounts of salt, pepper, mustard, sugar and molasses may be added to the beans for flavoring after which a cover is placed loosely over the pork and beans. The cover should be of less diameter than the diameter of the top opening of the crock in order to permit the water to evaporate and to prevent accumulation of steam in the beans while cooking. I have found that an ordinary iron pie-plate of proper diameter placed loosely on top serves the purpose well.

Thus prepared the crocks are placed preferably in a brick oven and subjected to a temperature of from 350° to 450° Fahrenheit for a period of about eight or nine hours, the length of time varying to some extent according to the temperature maintained. A temperature of 350° constantly maintained is sufficient for the cooking but of course will require a longer time than a higher temperature. During the baking, water should be added from time to time as required, as a rule about every three hours, to compensate for the evaporation and to maintain the water level above the topmost layer of beans, but toward the end of the baking the surplus water on the top only should be allowed to evaporate. The addition of water from time to time prevents burning of the beans and also takes up the fat from the pork and particles from the beans thereby forming a rich, delectable juice which permeates the beans at the conclusion of the baking. Frequently the top beans are more or less scorched or burned but these may be scraped off and thrown away.

The second step of the process consists in canning the beans immediately at the conclusion of the baking and while they are still hot and this step is one of the most important parts of my invention. Any suitable means may be used for accomplishing this result and one such is as follows. When removed from the oven, the beans are immediately transferred from the crocks to a large jacketed kettle which is kept at a temperature of between 200 and 212 degrees Fahrenheit by means of hot water fed with live steam circulated through the jacket. The kettle is preferably arranged in close and convenient proximity to a filling table and a sealing machine of any suitable construction so that the cans may be filled and sealed without any appreciable lapse of time between the filling and the sealing operations. Cans of various capacities from one quart to four quarts may be used; the most convenient size for general household use being one quart cans. In the bottom of each can is placed a piece of the cooked pork suitable in size to the capacity of the can and the cans are rapidly filled from the supply in the jacketed kettle by the use of a dipper and a funnel adapted to fit the open mouth of the can, each can as it is filled being passed through the sealing machine and sealed. This work may be performed rapidly and when so done, the temperature of the beans does not drop appreciably. I have found from exhaustive tests that the temperature at the time of sealing ranges from 182 to above 190 degrees Fahrenheit. The cans may be heated before being filled, if desired, but I have not so far found it necessary. The beans are accompanied by more or less juice containing a percentage of fat derived from the pork, which juice tends to maintain the temperature of the beans during the necessary handling in this step of the method.

The third step of the process consists in sterilizing the canned beans. Immediately upon removal from the sealing machine, the cans are placed in a cast iron retort of ordinary and well known construction adapted for the purpose and capable of being made steam tight, which retort is then closed and the cans are sterilized by being subjected to a steam pressure of from thirteen to fifteen pounds pressure; that is, to a temperature ranging from about 220 to 240 degrees Fahrenheit. For sterilizing ordinary one quart cans about an hour and a quarter is required and for larger cans a longer time up to about an hour and a half for cans of four quart capacity. At the end of the sterilizing the steam is turned off in the retort and it is filled with cold water of ordinary faucet temperature and the cans allowed to cool in the water before being removed. When removed they are ready for labelling and packing.

As stated before, it is important and essential in the canning step of the process, that the temperature of the beans be maintained as high as possible until the cans are sealed. In the evolution of my process I have found that unless the temperature is maintained at one hundred and eighty degrees Fahrenheit or above that fermentation may start in the cans and the beans become spoiled or at the very least the flavor be lost and that this tendency increased rapidly with reduced temperatures. In my experience, I have found that when the beans are canned cold, they almost invariably turn sour and when canned at temperatures ranging from eighty degrees to approximately one hundred and sixty-five degrees Fahrenheit, some turn sour and others are deleteriously affected in color and flavor. As a rule the percentage of beans actually soured decreases with the rise in temperature, but even when the beans are not actually sour yet they are apt to be pale in color and to have a slight vinegary or sour taste which is destructive of the original flavor of baked beans. This tendency decreases with the rise in temperature and although I am unable to state the exact point at which it ceases my experience has been that at a temperature of one hundred and eighty degrees Fahrenheit or above it is entirely eradicated. It may be that the beans can be safely canned at a temperature somewhat lower than one hundred and eighty degrees but I have thus far been unable to determine this point definitely and since it is entirely feasible to carry out my process at the last stated temperature or above, I prefer to do it and thereby avoid all risk.

The condition of the cans will indicate the condition of the contents. In all canned goods, the cans should indicate a partial vacuum inside by one or more indentations and where these are lacking canners are accustomed to reject the goods as spoiled. I have found that when the beans are sour the can bulges showing the effect of the pressure exerted by the gases of fermentation. In some cases the can shows neither a bulge nor an indentation but appears to be in a state of equilibrium so that when pressed in and released it resumes its original position. In such cases the beans are not a healthy color and the original flavor is lacking.

Another important and essential consideration in carrying out the process is to secure a rapid cooling of the cans at the completion of the sterilizing. If the cans are removed from the retort and allowed to cool naturally, I have found that the beans in the centers of the cans will overcook, turn brown and have a burned taste which spoils their salability. The effect seems to resemble that of a fireless cooker. When, however, the cans are cooled quickly as by the admission of water of natural temperature into the retort all of the foregoing deleterious results are obviated. Although I prefer and it is convenient to cool the beans in the retort, any other suitable means may be used for accomplishing this result.

In carrying out my process I have found that the California pea bean is best adapted for baking and canning by my method for the reason that the bean remains whole and does not become mushed or crumbled. Yellow eye or kidney beans may also be treated by this method, and it is possible that other beans having the same characteristics as the California pea beans may be treated with equally good results, but I have found that the large pea beans are apt to break down, lose their form and become more or less mushed.

As a result of my method baked beans having all the characteristics, qualities, appearance and flavor of home baked beans may be produced and placed upon the market as a commodity which can be kept indefinitely and which can be prepared for consumption in a few minutes by merely removing the beans from the can and heating them. The flavor and taste of this product is due, in a large measure to the fact that the pork, which is cooked with the beans, is subjected to a very high degree of heat for a considerable period, so that the fat therefrom thoroughly permeates and flavors the beans, and this flavor can be regulated to a considerable extent by increasing or decreasing the amount of pork in proportion to the amount of beans. Where the beans are canned under the old method, the pork is never thoroughly cooked and the flavor of the pork does not, to any appreciable extent, affect the flavor of the beans, so that they taste more or less like stewed beans without the burned flavor of baked beans.

In the foregoing I have described the preferred form of my invention and the method of carrying it out but it is to be understood that I am not to be limited to the precise manner of procedure or the particular means used to secure the desired results since various other means may be employed for these purposes all within the purview of my invention.

In the foregoing, I have pointed out that my experience has been that baked beans canned at temperatures of one hundred and eighty degrees Fahrenheit and above will not afterwards ferment or otherwise deteriorate but will keep indefinitely in the cans and that the lower limit of the range of temperature at which this step of my process can be performed with safety cannot be determined accurately. Although the beans are maintained in the jacketed kettle at a temperature between two hundred and two hundred twelve degrees Fahrenheit there is necessarily a slight lowering of this temperature in the placing of the beans in the cans before they can be sealed yet no deleterious results have ever been noted by me in beans canned above one hundred and eighty degrees. It is undoubtedly true that baked beans can be canned at temperatures below one hundred and eighty degrees Fahrenheit and it may be that at a temperature of one hundred and sixty-five degrees Fahrenheit or even lower, practical results may be secured. In view of these conditions, I wish it to be understood that in using the phrase "approximately one hundred and eighty degrees Fahrenheit" in the following claims I desire to cover a range of temperature sufficiently high to secure the desired results.

In other cases where specific temperatures or ranges of temperatures are stated, it is to be understood that the same are to some extent approximate and may be varied by increasing or decreasing the time element as the case may be. In all cases, however, a worker skilled in the art will have no difficulty in following the directions given and in securing the results aimed at.

What I claim is:

1. The method of preparing and canning baked beans consisting in baking the beans under a high temperature ranging from three hundred and fifty to four hundred and fifty degrees Fahrenheit until the beans are thoroughly baked and then placing the baked beans in suitable cans while the beans are at a temperature of approximately one hundred and eighty degrees Fahrenheit and sealing the cans immediately.

2. The method of preparing and canning beans consisting in baking the beans, together with pork, under a high temperature until they are thoroughly baked, said pork and beans being in the approximate proportions of thirty-five pounds of pork to one hundred pounds of beans, then transferring said pork and beans into suitable cans while maintaining the temperature of said pork and beans at approximately one hundred and eighty degrees Fahrenheit, sealing the cans immediately and then subjecting the sealed cans to steam pressure of a temperature from two hundred and twelve to two hundred and forty degrees Fahrenheit, to sterilize the same.

3. The method of preparing and canning beans consisting in baking the beans with a suitable amount of fat pork therein in suitable crocks under a high temperature from eight to ten hours until the same have been thoroughly baked, water being added to said beans from time to time to prevent burning, then transferring the baked beans to suitable cans, the temperature of said beans during said transfer being maintained at approximately one hundred and eighty degrees Fahrenheit, immediately sealing the cans after said transfer and then subjecting the sealed cans to steam pressure of a temperature between two hundred and twelve and two hundred and forty degrees Fahrenheit for between one and two hours to sterilize the same.

4. The method of preparing and canning baked beans consisting in baking the beans under a high temperature from eight to ten hours until the same are thoroughly baked, then placing the baked beans in suitable cans while at a temperature of approximately one hundred and eighty degrees Fahrenheit, sealing the cans immediately, then sterilizing the same and finally cooling the cans by immersion in water of normal temperature.

5. The method of preparing and canning baked beans consisting in baking the beans and placing the baked beans, before they have cooled materially, in suitable cans and sealing the same while the beans are at a temperature of approximately one hundred and eighty degrees Fahrenheit.

6. The method of preparing and canning baked beans consisting in baking the beans, maintaining the baked beans at a temperature of approximately two hundred degrees Fahrenheit after the baking is completed and until canned and placing the baked beans in suitable cans and sealing the same while the beans are at a temperature of approximately one hundred and eighty degrees Fahrenheit.

7. The method of preparing and canning baked beans consisting in baking the beans, placing the baked beans, before they have cooled materially, in suitable cans and sealing the cans while the beans are at a temperature of approximately one hundred and eighty degrees Fahrenheit, sterilizing the same and at the conclusion of the sterilizing operation cooling the same by immersion in cold water.

8. The method of preparing and canning baked beans consisting in baking the beans under a high temperature until thoroughly baked, then canning the beans while at a temperature of approximately one hundred and eighty degrees Fahrenheit, the cans being sealed immediately on being filled, then sterilizing the same by subjection to a temperature ranging from approximately two hundred and twelve to two hundred and forty degrees Fahrenheit and, finally, immediately at the conclusion of sterilizing operation, immersing the said cans in cold water to cool them rapidly.

In witness whereof, I hereunto set my hand this 11th day of December, 1922.

VICTOR A. FRIEND.